STABILIZING AMPLIFIER FOR COLOR TELEVISION SYSTEM

Filed Dec. 13, 1952 5 Sheets-Sheet 1

INVENTORS
GEORGE A. OLIVE
& JOSEPH G. REDDECK
BY
ATTORNEY

STABILIZING AMPLIFIER FOR COLOR TELEVISION SYSTEM

Filed Dec. 13, 1952 5 Sheets-Sheet 2

INVENTORS
GEORGE A. OLIVE
& JOSEPH G. REDDECK
BY [signature]
ATTORNEY

STABILIZING AMPLIFIER FOR COLOR TELEVISION SYSTEM

Filed Dec. 13, 1952 5 Sheets-Sheet 3

INVENTORS
GEORGE A. OLIVE
& JOSEPH G. REDDECK
BY [signature]
ATTORNEY

STABILIZING AMPLIFIER FOR COLOR TELEVISION SYSTEM

INVENTORS
GEORGE A. OLIVE
& JOSEPH G. REDDECK
BY
ATTORNEY

STABILIZING AMPLIFIER FOR COLOR TELEVISION SYSTEM

Filed Dec. 13, 1952 5 Sheets-Sheet 5

INVENTORS
GEORGE A. OLIVE
& JOSEPH G. REDDECK
BY [signature]
ATTORNEY

United States Patent Office 2,793,246

Patented May 21, 1957

2,793,246

STABILIZING AMPLIFIER FOR COLOR TELEVISION SYSTEM

George A. Olive, Princeton, and Joseph G. Reddeck, New Brunswick, N. J., assignors to Radio Corporation of America, a corporation of Delaware Application December 13, 1952, Serial No. 325,817

11 Claims. (Cl. 178—5.4)

This invention relates to color television systems and particularly to apparatus and methods of eliminating undesired disturbances in the transmission of composite color television signals.

Modern black-and-white, or monochrome, television signals are often picked-up from a distant point and sent to the main transmitter for broadcast. The remote point may be a portable transmitter, or a camera located elsewhere in the main transmitter building. The signal also may be obtained from a network circuit. In the course of relaying the signal to the main transmitter various types of interference often arise to distort the desired composite signal. The interference may include hum, loss of low frequency components, saturation of the synchronizing pulses, and thermal or other random noise. Frequently the remote signals, when received, are at too low a level to be fed directly into the main transmitter.

To correct these deficiencies a so-called "stabilizing amplifier" is commonly employed intermediate the remote source and the main transmitter. Customarily, the stabilizing amplifier contains circuits which amplify the picture information, restore the synchronizing pulses to the proper amplitude by a "stretching" or equivalent circuit, and otherwise correct the distorted waveform.

Representative stabilizing amplifiers for monochrome television transmitters are the RCA Model TA-5B as described at page 34 of "Broadcast News" for May 1948, and the RCA Model TA-5C as listed in the RCA "AM-FM Broadcast Equipment Catalog—1950" at page 189.

These stabilizing amplifiers have proved highly satisfactory for black-and-white transmission. However, color television signals of the color subcarrier type includes additional components. Not only does the color system referred to have a horizontal blanking and synchronizing pulse similar to the monochrome composite signal, but it also has a "burst" of a sub-carrier frequency on the back porch. While various positions of the "burst" upon the horizontal blanking signal have been proposed, this invention will be described in connection with the standards for U. S. broadcast color television promulgated by the Federal Communications Commission released as FCC Public Notice No. 53-1663 on December 17, 1953, according to these specifications. The "burst" is applied to the back porch so that it swings symmetrically above and below the black level, and wherever the term "burst" is used herein it designates this particular location of the sub-carrier synchronizing frequency. The "burst" is employed at the receiver to synchronize the phase and frequency of the color sampling oscillator. Its function and operation are more fully described in an article in the February 1952 issue of "Electronics" at page 96.

Furthermore, in cases of transmission of a color with 100% saturation, presently proposed color television transmission signal standards permit the excursion of the video signal into the "blacker-than black region."

Because of these factors, the use of unmodified monochrome stabilizing amplifiers is not satisfactory. If a composite color signal is fed through an RCA TA-5B stabilizing amplifier, for example, the non-linear, so-called "stretching" stage will act, not only upon the horizontal sync signal, but also upon the burst, resulting in phase distortion of the latter. In the TA-5C the initial clipping stage will adversely affect the burst by reducing its amplitude and changing its phase. It will also clip some color information when the video signal exceeds the blacker-than black level.

Thus, it is often the practice to use only the amplifier section and the D. C. restorer sections of the stabilizing amplifier while the sync signal stretching sections and clipping stages are inactivated. Consequently, no interference reduction or sync pulse stretching other than the low frequency correction by clamping is accomplished.

A principal object of this invention is to provide a means for and method of elimination of the spurious signals and interference mentioned above, especially in connection with modern color television transmission systems.

More specifically, an object of the invention is to provide for use with a color television transmitter a means for reduction of noise and other interference and for restoration of the horizontal blanking and sync pulses to the waveforms desired.

A further object is the adaptation of monochrome stabilizing amplifiers presently employed with black-and-white transmission for use with modern color television transmitters.

Still another object is the provision of a method and apparatus for separating significant signals and information elements, both having the same frequency, from composite signals which include the significant signals, the information elements, and other elements.

The invention provides a practicable and economical method of eliminating interference and improving the waveform of the incoming composite color signal. This is accomplished by using in one form of the invention a substantially unaltered black-and-white type of stabilizing amplifier together with circuitry that may be coupled with it, obviating the need for discarding some expensive present equipment.

The invention may be applied to color television systems or to other systems in which it is desired to extract certain portions from a composite signal. The composite signal may be such that essentially two broad types of signals are contained therein. One type may carry two sets of elements, i. e., (1) information elements such as the chrominance signals of color television systems and (2) significant signals such as the synchronizing "burst" of an oscillatory wave having the color subcarrier frequency which controls the demodulator frequency in U. S. standard broadcast color television. The other type may carry other elements such as the luminance information, the line and field synchronizing or "sync" pulses, and the blanking pulses. In the case of color television, these other elements substantially comprise an ordinary black-and-white composite video signal.

As applied to U. S. standard color television, the invention separates the composite color video signal originating from the remote point and treats each separated component in different channels. The wave of channel one contains substantially all frequencies of the incoming composite signal except those in the vicinity of the color subcarrier, i. e., 3.89 or 3.58 megacycles. These essentially are equivalent to composite monochrome or black-and-white video signal, that is to say, they have the usual horizontal and vertical sync and blanking pulses, equalizing pulses and the intensity information. These are fed to a conventional black-and-white stabilizing amplifier where they are acted upon in practically the same fashion as the input from an ordinary black-and-white camera.

The wave in channel two contains substantially only the frequency components of the incoming composite signal which are in the neighborhood of the color subcarrier. As a matter of fact, some of the black-and-white signal also passes into channel two and some of the color components pass into channel one. However, for all practical purposes, and for convenience in explanation, this may be ignored, since it does not affect the operation of the invention. Since it is inherent in the operation of the separating means that undesired "pips" representing the leading and trailing edges of the horizontal sync pulse occur in the wave of channel two they are removed by circuitry which is keyed by a horizontal sync pulse separator. The waves of channel one and channel two may then be recombined before they are fed to the main transmitter, or may be utilized separately if desired.

A more detailed and functional explanation of our invention will be given in connection with the accompanying drawings, in which.

Figure 1:
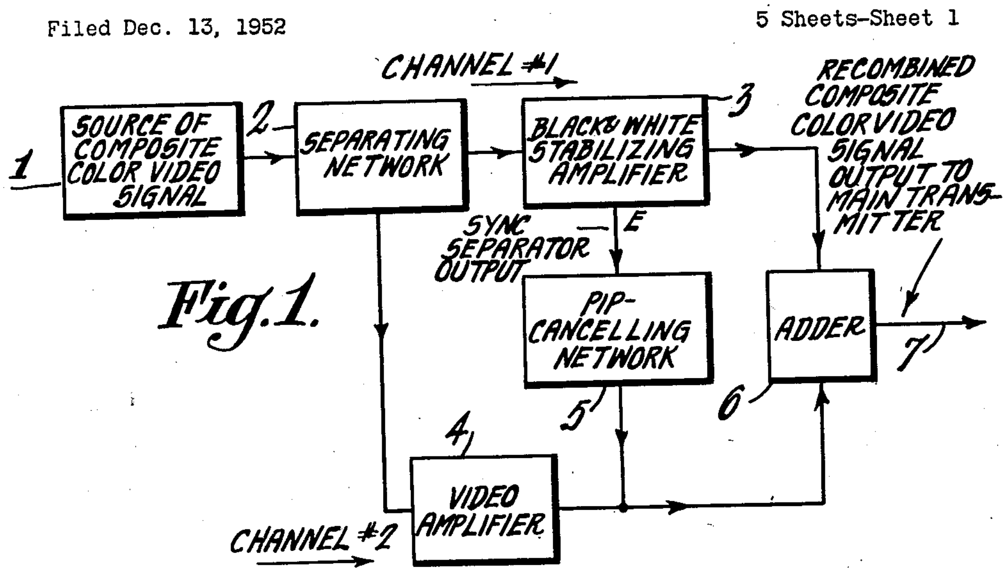
Figure 1 is a block diagram showing one form of the invention.

Figure 1 is a block diagram showing the overall relation of the constituent circuits of this invention to one another. A source of composite color video signals 1 feeds a frequency separating network 2 which divides the composite signal into essentially two components. The first signal component is applied to a low frequency channel one, and the second signal component is applied to a high frequency channel two.

The first signal component, known hereafter as the channel one wave, contains substantially all frequencies of the composite signal except those in the vicinity of the color subcarrier frequency. This signal component is applied to a black-and-white stabilizing amplifier 3 such as the RCA Model TA–5B or TA–5C as mentioned above. Since it is essentially a black-and-white composite signal, the stabilizing amplifier 3 reduces interference on the front and back porches, restores the horizontal sync pulse to the proper shape and amplitude, and eliminates low frequency distortion. The output of the stabilizing amplifier 3 is fed to an adder 6.

Figure 6:
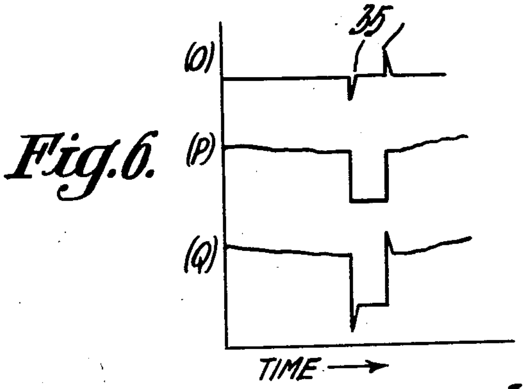
Figure 6 illustrates the effects of undesired pips if not removed.

The second signal component, known hereafter as channel two wave, contains frequencies in the color subcarrier region, including the "burst" and color components, plus undesired "pips" resulting from the fact that high frequency components of the horizontal synchronizing pulses are passed by the separating network 2 to channel two. The pips 35 are shown in curve (O) of Figure 6 and in curve (D) of Figure 4. If the channel two wave, after passing through video amplifier 4, were added back to the output of stabilizing amplifier 3, the horizontal sync pulse shown in curve (P) of Figure 6 would have the wave shape as shown in curve (Q) of Figure 6, and would not conform with the requisite sync pulse standards. It is therefore necessary to introduce a circuit for the elimination of these pips which will not affect the other parts of the channel two waves.

To accomplish this, a pip-cancelling network 5 is coupled with the sync separator section of stabilizing amplifier 3 or to an external sync separator in such a manner that the effects of network 5 are operative on the undesired pips only during the interval between the beginning of the positive pip and the end of the negative pip.

To insure that the pip-cancelling and wave recombination occur at the proper time, delay circuits which are not shown in Figure 1 but which are discussed fully in connection with Figures 2, 3, 7, and 8 are inserted at various points. They may be placed, for example, between the sync separator stage of stabilizing amplifier 3 and the pip-cancelling means 5. They may be alternatively used in the branch of the circuit in which amplifier 4 is located, as for example before amplifier 4. Optional placement of these delay circuits depends on the particular embodiment chosen of this invention, as will be explained in connection with Figures 2, 3, 7, and 8 below.

Since the stabilizing amplifier 3 introduces a certain delay when acting on the channel one wave, it is necessary to equalize it before recombination with the channel two wave. This may be accomplished by additional delay means placed in the circuit between amplifier 4 and adder 6 and is discussed below in connection with Figures 2, 3, 7, and 8.

The output of stabilizing amplifier 3 and that of amplifier 4 are fed to adder 6 where they are recombined, forming a disturbance-free reproduction of the signal originating from source 1. The output of adder 6 is then fed to the main transmitter 7 for broadcast.

Figure 2:
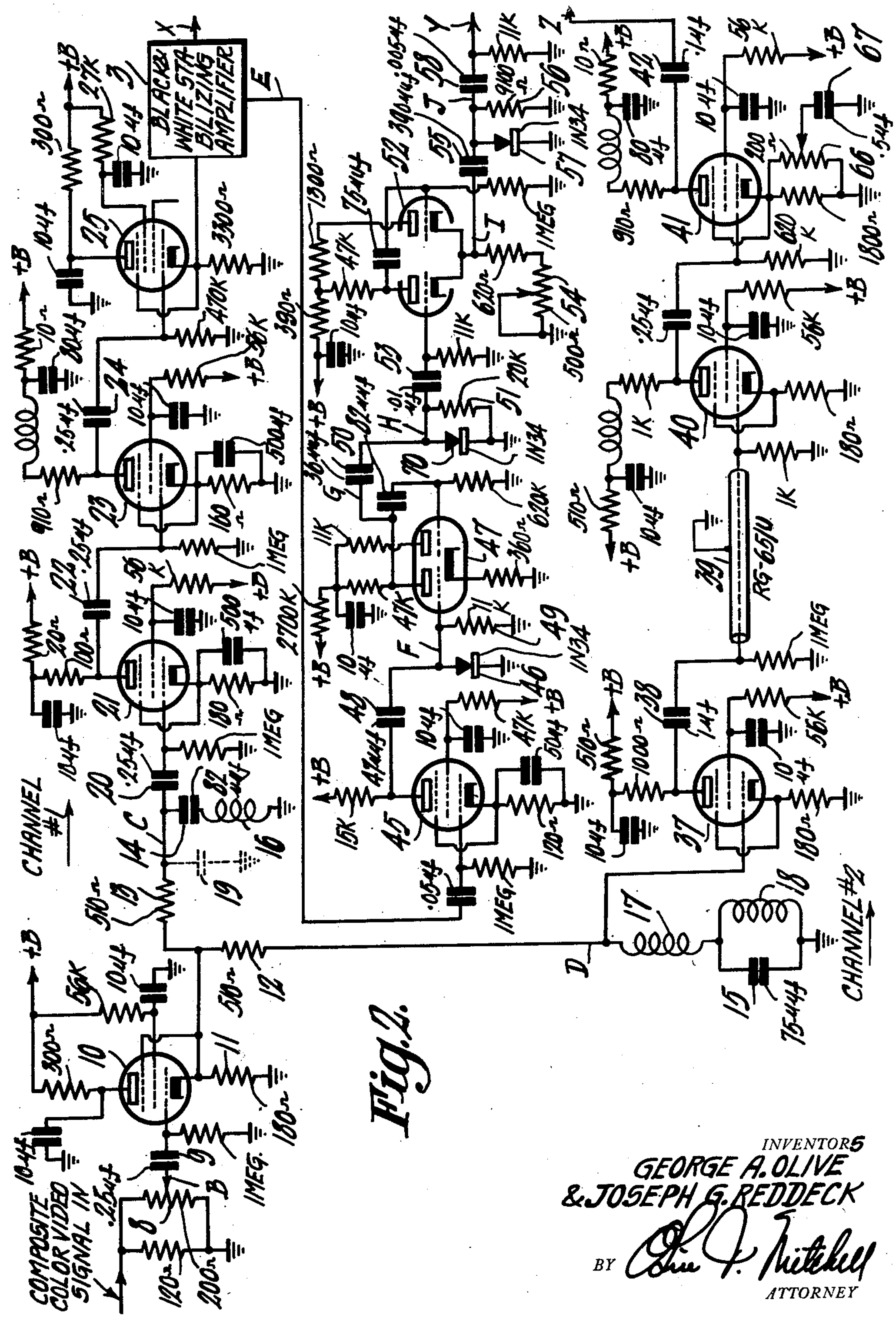
Figure 2 is the first part of a circuit and block diagram illustrating one embodiment of the invention.
Figure 3:
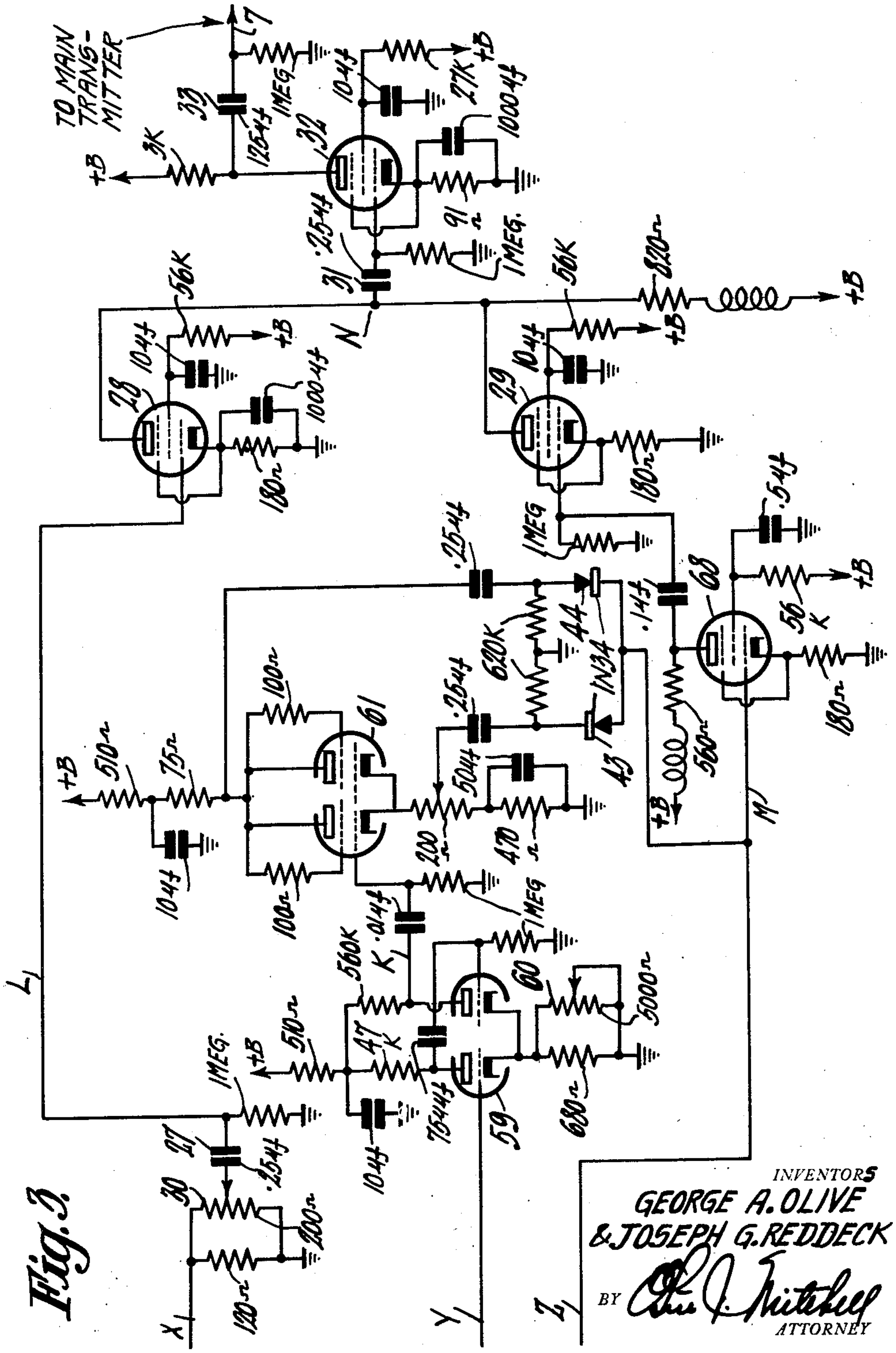
Figure 3 is the second part of the diagram of Figure 2 continuing from points X, Y, and Z in Figure 2.

Figures 2 and 3 show an actual embodiment of our invention when used with a composite color television system of the type previously described. Signals from a remote source are picked off variable resistor 8, and at point B (input circuit of tube 10) have the wave form indicated in curve (B) of Figure 4. They are passed through coupling condenser 9 to the control grid of vacuum tube 10. The latter is a driving amplifier stage with cathode follower output being taken across unbypassed cathode resistor 11 and fed to a separating network. The separating network comprises resistors 12 and 13, condensers 14 and 15, and inductances 16, 17, and 18.

The separating network presents a constant impedance to its input whenever the sum of the impedances of the tank circuit comprising condenser 15 and inductance 18, and its associated inductance 17 multiplied by the impedance of the series resonant circuit containing condenser 14, inductance 16, and its associated stray capacitance 19 (which is about 10 micromicrofarads) equals the resistance product of resistor 12 and resistor 13. Resistor 12 and resistor 13 both have the same resistance. The constant impedance thus presented to the input is the resistance of either resistor 12 or 13 taken singly.

It is a further characteristic of this separating network that the composite wave, which has been separated by the parallel resonant branch and the series resonant branch, when recombined, will form an undistorted reproduction of the composite color video signal input. Both the tank circuit and the series resonant circuit are resonant at 3.89 megacycles in the embodiment illustrated or the frequency of the particular color subcarrier chosen.

Although the separating network shown in Figures 2 and 3 has been found to be very efficient, other means may also be used. So long as resistance 12 equals resistance 13 and so long as the impedance from point D to ground when multiplied by the impedance of point C to ground equals the product of the resistors 12 and 13, the composite video signals may be effectively split. It does not matter what forms the impedances from points D and C to ground respectively take. The series resonant circuit for example, could be replaced by any two terminal impedance network which had a low gain at the subcarrier frequency chosen. The series resonant circuit could be replaced by a capacitance and the tank circuit and associated inductance 17 could be replaced by an inductance, so long as the product of their impedances equalled the product of resistors 12 and 13.

*Channel one operation*

Figure 5:
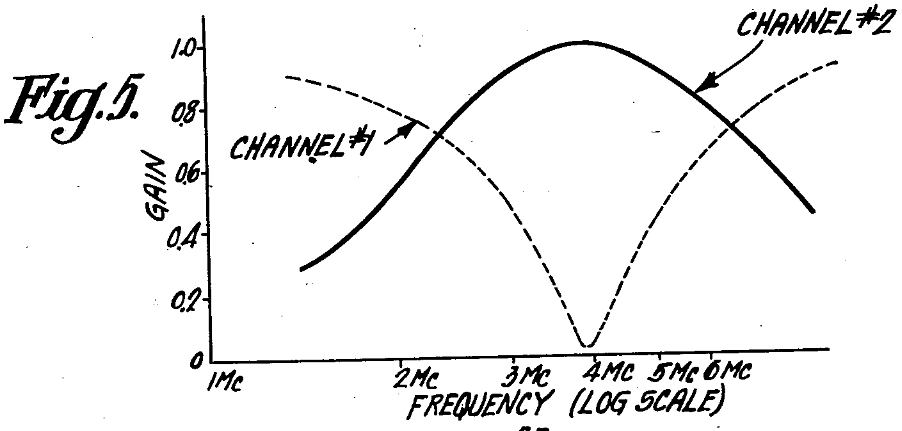
Figure 5 shows graphically the characteristics of the two resonant circuits in the circuit diagrams (Figures 2 and 3)
Figure 4:
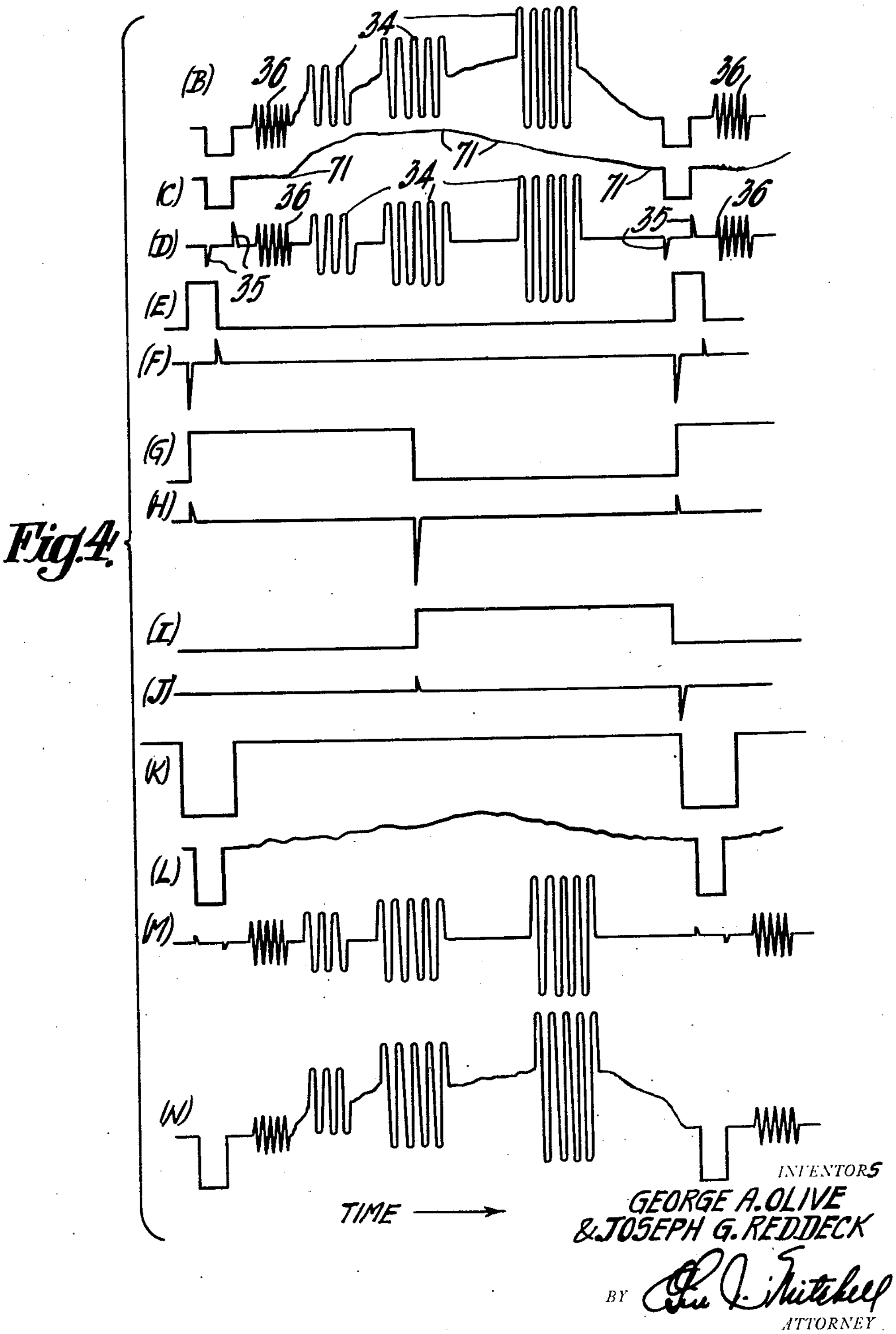
Figure 4 is a collection of waveforms at various points in the circuit of the illustrative form of the invention.

At point C the channel one wave has the form indicated in curve (C) of Figure 4. All but a very minor portion of the burst has been eliminated from the back porch of the horizontal blanking pulse. Those parts of the composite signal known as the brightness or luminance signal comprising monochrome information 71 are indicated thereon. Most of the color subcarrier frequency (3.89 megacycles) elements have been filtered out by the combined effect of the parallel and series resonant circuits tuned to 3.89 megacycles. The series trap comprising condenser 14 and inductance 16 has the characteristic curve shown by the broken line curve of Figure 5. It has minimum gain at 3.89 megacycles. By its trapping action, no appreciable part of the color signal is permitted to get into the sync pulse level.

The channel one wave then passes via coupling condenser 20 to the control grid of pentode 21 which is a sync pulse polarity inverter. Its output is coupled through condenser 22 to the control electrode of a pentode tube 23 which further amplifies it. A cathode follower pentode 25, coupled to the plate of tube 23 by way of condenser 24 serves as a driving stage which gives the required input to the black-and-white stabilizing amplifier 3.

Stabilizing amplifier 3 is a conventional black-and-white amplifier such as the RCA types TA–5B or TA–5C or any equivalent circuit. It is primarily intended to restore the horizontal sync pulses to the proper shape and amplitude, reduce interference on the front and back porches, clamp out low frequency distortions, and generally amplify its input signal.

Depending on the type of stabilizing amplifier used, its output waveform may assume various shapes. The TA–5C, has an initial stage which clips the horizontal sync a little below the black level, thus producing a more disturbance-free back porch than the TA–5B which lacks such a stage. Many stabilizing amplifiers incorporate a sync separator stage whose output is shown as being at point E, and whose significance will be later elaborated in connection with the explanation of the pip-cancelling network.

Figure 3 continues the circuit of channel one from point X of Figure 2. The output of the stabilizing amplifier 3 is fed to one-half of an adder stage including two pentodes 28 and 29 through a gain control 30 and a condenser 27. The adder stage can alternatively be a passive resistance network, but in that case the resistance chosen must be very large so as to prevent interaction of the passive network with its input. If the resistance is large, there is too great attenuation of the signal by the passive resistance network. Pentodes such as a pair of 6CB6's are preferable although equivalent tubes like a pair of 6AC7's or other tubes having a high transconductance and a gain of 1–5 may also be used. On the plate of tube 28 of the adder stage, the channel one wave is recombined with the channel two wave which appears on the plate of tube 29. The disturbance-free composite color video signal is taken from the common plate connection through coupling condenser 31 to the input grid of pentode 32, a driving stage for the main transmitter input to which it is coupled by means of blocking condenser 33.

*Channel two operation*

Returning to Figure 2, the channel two wave is picked off at point D, the junction of resistor 12 and inductance 17, and has the generalized form shown in curve (D) of Figure 4. Since the tank circuit including condenser 15 and inductance 18, and associated inductance 17 resonates at the frequency of the color subcarrier, it has the band pass characteristic shown by the solid line curve of Figure 5. Analysis shows that the channel two wave is composed of the burst 36, color components 34 and pips 35. The color components 34 contain the color information and have the same frequency as the burst 36. The pips 35 are also shown in curve (O) of Figure 6 and represent the leading and trailing edges of the horizontal sync pulse. They are caused by the inherent differentiating action of resistance 12, inductance 17, and the tank circuit including condenser 15 and inductance 18. As explained above in connection with Figure 6, they must be removed before the channel two wave, shown in curve (D) of Figure 4 is recombined with the channel one wave, shown in curve (C) of Figure 4, in adder tubes 28 and 29. The operation of the pip-cancelling network will be explained in a separate section below.

The channel two wave with its elements 34, 35, and 36 is fed directly to the input of tube 37. This is a pentode amplifier which gives an isolation point for the delay circuit which follows. By way of a 1 microfarad condenser 38, the output of tube 37 is coupled with the inner conductor of a length of RG–65/U coaxial cable constituting a delay line 39. Its dimensions are so chosen as to introduce a delay of about .2–.3 microseconds. This equalizes the delay of channel one resulting from the effects of stabilizing amplifier 3 on the black-and-white component, so that the channel one and channel two waves will recombine in adder tubes 28 and 29 in the proper time relation. This delay line could alternatively be placed between tube 41 and tube 68. Other placements are also possible and may be adapted to the design requirements.

The delay in channel two may be accomplished by means other than the delay line, although the line has proved practicable, convenient, and inexpensive in the embodiment illustrated. Any broad-band lumped constant delay circuit with a cut-off frequency of more than 4 megacycles can be substituted.

After the channel two wave has been sufficiently retarded by the delay line 39, it is fed to the first of two cascaded pentode amplifiers, tubes 40 and 41. These are conventional broad-band video amplifier stages which serve, in conjunction with amplifier tube 37, to increase the amplitude of the channel two wave. These amplifier stages minimize the effective disturbances due to the subsequent clamping. They also amplify the channel two wave to equalize the channel one wave amplification due to tubes 10, 21, 23, 25 and the stabilizing amplifier 3. The proper amount of gain in channel two is regulated by variable resistor 66, which, with capacitance 67, controls the amount of cathode feedback.

Returning to Figure 3, the amplified output of tube 41 is coupled by condenser 42 to the input electrode of phase inverting 68, shown as being connected to point Z, and also to the anode and cathode respectively of two crystal diodes 43 and 44. These diodes are so triggered that their clamping action practically eliminates the undesired pips 35 from the channel two wave so that at point M the latter has the configuration indicated in curve (M) of Figure 4. The operation of the clamping circuit is described in detail in the next section below. The channel two wave minus the pips, is fed to adder tube 29, from the plate of tube 68. In the common plate circuit of adder tubes 28 and 29, the channel two wave is recombined with the channel one wave. The wave at point N is shown in curve (N) of Figure 4 and is an amplified disturbance-free replica of the input waveform picked off resistor 8 which is shown in curve (B) of Figure 4. The adder output is fed to driving amplifier 32 just ahead of the input to the main transmitter 7.

*Pip-cancelling network*

As explained above, the differentiating action of the channel two tank and associated circuit causes pips 35 corresponding to the leading and trailing edges of the horizontal sync pulse. One method of eliminating them is illustrated in Figures 2 and 3 and has given excellent results.

Point E in Figure 2 is shown as being the output of the sync separator stage of the stabilizing amplifier 3. In the latter, the sync separator is used to key clamping circuits to restore the D. C. level which has been lost since the D. C. is not transmitted on the cable which brings the signal from the camera or the studio to the main transmitter. It also serves to keep the black level constant for clipping purposes and removes low frequency distortions. However, it is not necessary that the source of sync signals, which are necessary for the operation of the pip-cancelling means, be in the stabilizing amplifier 3. It may be found desirable to employ a sync separator external to the stabilizing amplifier to furnish the necessary keying impulses. The camera itself often contains a sync separator from which the sync signals may be derived. Whatever the source, the sync signals would be so used as to trigger the action of crystal diodes 43 and 44 during the occurrence of the pips 35 in the channel two wave.

In the embodiment depicted in Figures 2 and 3 the sync pulses shown in curve (E) of Figure 4 originating from the sync separator of stabilizing amplifier 3 at point E are fed to the control grid of tube 45. This is a pentode that reverses the phase of the sync pulses so that they are of negative polarity when fed to tube 47 which is the first of three multivibrators. The low capacity condenser 48 and the resistance 49 differentiate the negative output pulse of tube 45 so that positive and negative spikes result. The negative spike corresponds to the leading edge of the sync pulse and the positive spike corresponds to the trailing edge. Since it is desired that the leading edge control the next multivibrator, the positive spike at point F is suppressed by crystal diode 46 which reduces it substantially as shown in Figure 4(F). The deep negative spike triggers the grid of tube 47 which is a cathode-coupled multivibrator. It is a common cathode double triode, such as a 6J6 or equivalent and its output at point G is a square wave as pictured in Figure 4(G). This output pulse has a greater time base than the output of tube 45, and is passed through a differentiating network comprising low capacity condenser 50 and resistor 51. As in the previous stage positive and negative spikes, corresponding to the leading and trailing edge of the positive pulse output of tube 47 result. Crystal diode 70 reduces the amplitude of the positive spike as shown in Figure 4(H) so that the deep negative spike at point H corresponding to the trailing edge of the output pulse of tube 47, is coupled through condenser 53 to the input of one-half of double triode 52. This is a second cathode-coupled multivibrator with a variable cathode resistance 54 which controls the width of the output pulse. The output of tube 52 at point I shown in curve (I) of Figure 4, which is a pulse even wider and shorter than that of the previous stage, is the passed through a differentiating network consisting of low capacity condenser 55 and resistor 56. Crystal diode 57 removes the resultant positive-going spike corresponding to the leading edge of the output square pulse of tube 52 so that at point J the waveform is as indicated in curve (J) of Figure 4.

By way of condenser 58, the differentiated pulse is fed to the control grid of one-half of double triode 59. This tube connection is shown in Figure 3 continued from point Y of Figure 2. Tube 59 is a third cathode-coupled multivibrator and generates at point K a relatively narrow and steep negative square wave as shown in curve (K) of Figure 4. Voltage divider 60 controls the output pulse width of this stage.

The aggregate effect of tubes 47, 52, and 59 is a delay of the order of 63.5 microseconds, i. e., the duration of one horizontal line. It is so designed that although it is triggered by the leading edge of a sync pulse in one line, the pip-cancelling network is delayed and becomes operative on the next line's pips. This arrangement is preferred because the elimination of pips is most completely and effectively accomplished when the corrective circuit employed can operate at the very beginning of the undesired pip and during the whole time that it occurs.

Although the embodiment of Figures 2 and 3, which uses a keyed clamp for pip-cancellation, has been very effective, one could employ the keyed clamp so that the cancellation occurs on the same line. In this alternative case the delay system including tubes 47, 52, and 59 and their related circuitry would be omitted. A delay circuit would then be inserted in channel two to adjust for the sync separator delay so that the clamping action coincided with the appearance of the pips. A further delay would also have to be introduced so that the channel one wave and the channel two wave would be timed properly with respect to one another before being added in tubes 28 and 29. Thus the delay might be either in channel one after the stabilizing amplifier 3 or in channel two after the clamp circuit, depending on the delay characteristics of each channel. They may be types similar or equivalent to those already discussed.

The square wave output of tube 59 is coupled to the tied-together grids of tube 61 which is a phase splitter. The latter serves to key the crystal diodes 43 and 44 which are connected 180° out of phase so that the positive and negative pips of channel two are individually and successively diminished. The consequent waveform at point M is shown in curve (M) of Figure 4, and it is noted that the pips have been largely suppressed by the clamping circuit. This wave is passed through a phase inverter stage comprising tube 68 whose output is fed to the input of adder tube 29. When the channel two wave has been added to the channel one wave by virtue of the common plate connection of tubes 28 and 29 the output waveform at point N is shown in curve (N) of Figure 4.

In the embodiment of Figures 2 and 3 the following tube types were used in a successfully operated system:

| Tube No.: | Tube type |
|---|---|
| 10 | 6CB6 |
| 21 | 6CB6 |
| 23 | 6CB6 |
| 25 | 6CL6 |
| 28 | 6CB6 |
| 37 | 6CB6 |
| 40 | 6CB6 |
| 41 | 6CB6 |
| 68 | 6CB6 |
| 29 | 6CB6 |
| 45 | 6AU6 |
| 47 | 6J6 |
| 52 | 12AU7 |
| 59 | 12AU7 |
| 61 | 6AR5 |
| 43 | 1N34 |
| 44 | 1N34 |
| 46 | 1N34 |
| 70 | 1N34 |
| 57 | 1N34 |
| 32 | 6CL6 |

The tubes listed above are meant only to be illustrative and equivalents therefor may be substituted. The tubes shown have been found entirely satisfactory so that their characteristics should be borne in mind when selecting alternates.

*Alternative embodiments*

While the diode clamping method of reducing pips is very effective, other alternatives are also feasible. For example, one can differentiate the pulses from the sync separator output at point E and then combine them in opposite polarity to the pips in channel two so as to cancel the latter.

Figure 7:
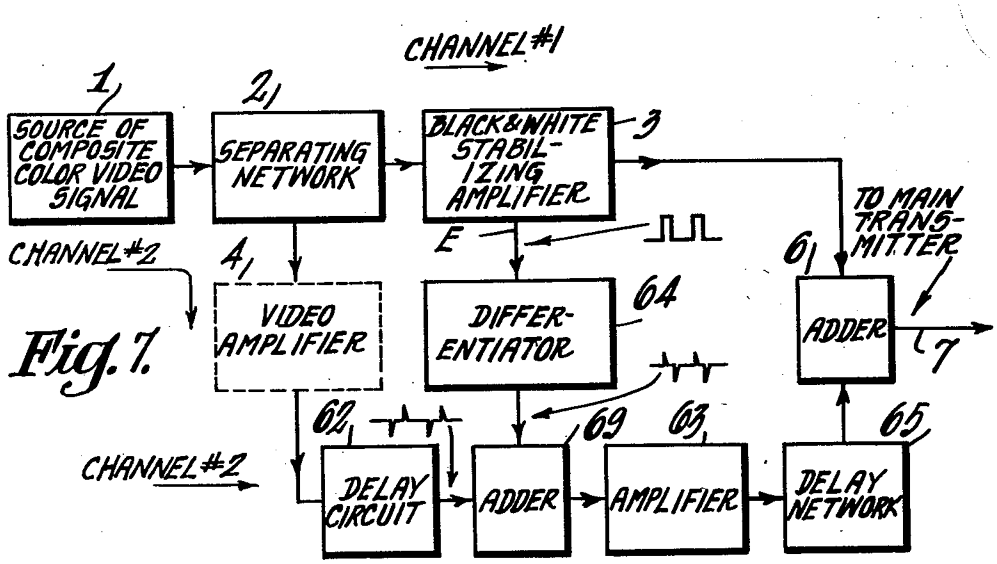
Figure 7 shows another embodiment of the invention in block form.

Figure 7 is one illustration in block form of how this can be accomplished. From a source 1, the input composite color video signal is fed to a separating network 2. Here the wave is split into its channel one and channel two components. The channel one wave is passed through a conventional black-and-white stabilizing amplifier 3 where interference is removed from the porches, the horizontal sync pulse is stretched, low frequency distortion is corrected, and the signal in general is amplified. From point E, which is shown as the output of a sync separator in the stabilizing amplifier but which can also be external thereto, the sync pulses are passed through a differentiating network 64. This may be a conventional resistance-capacitance type or equivalent. The output of the differentiator takes the form shown.

The channel two wave is picked off the separator 2 and fed to video amplifier 4 which is indicated by a broken line block to show that it may be dispensed with so long as there is a gain control elsewhere in this channel. Its output is similar to curve (D) of Figure 4; in Figure 7 only, the pips are shown. It is essential that the pulses from differentiator 64 be combined with the channel two pips at the right time. One method is by the insertion of delay network 62 which is a broad band delay line, like a length of RG–65/U coaxial cable, having a delay of several microseconds. This equalizes the delay inherent in the operation of the sync separator that may be contained in the stabilizing amplifier. At linear adder 69, the differentiated pulses from differentiator 64 and the pips from delay network 62 mutually cancel. Adder 69 can be any arrangement of two single tubes (or a multi-purpose tube) for example, with a common plate circuit such as tubes 28 and 29 in Figure 3. It can also be a circuit in which signals are passed through two resistances and the combined signal is taken off a common point. Other methods of combining signals are very well known to those skilled in the art and will serve equally as well here.

The output of adder 69 is amplified by broad-band amplifier 63 which increases the amplitude of the channel two wave to bring it to the level of the channel one wave that has been amplified. The output of tube 63 in turn is passed through a delay circuit 65 which equalizes the delay inherent in stabilizing amplifier 3. The channel one and channel two waves are finally recombined in adder 6 in the same manner as that of Figures 1, 2, and 3.

Figure 8:
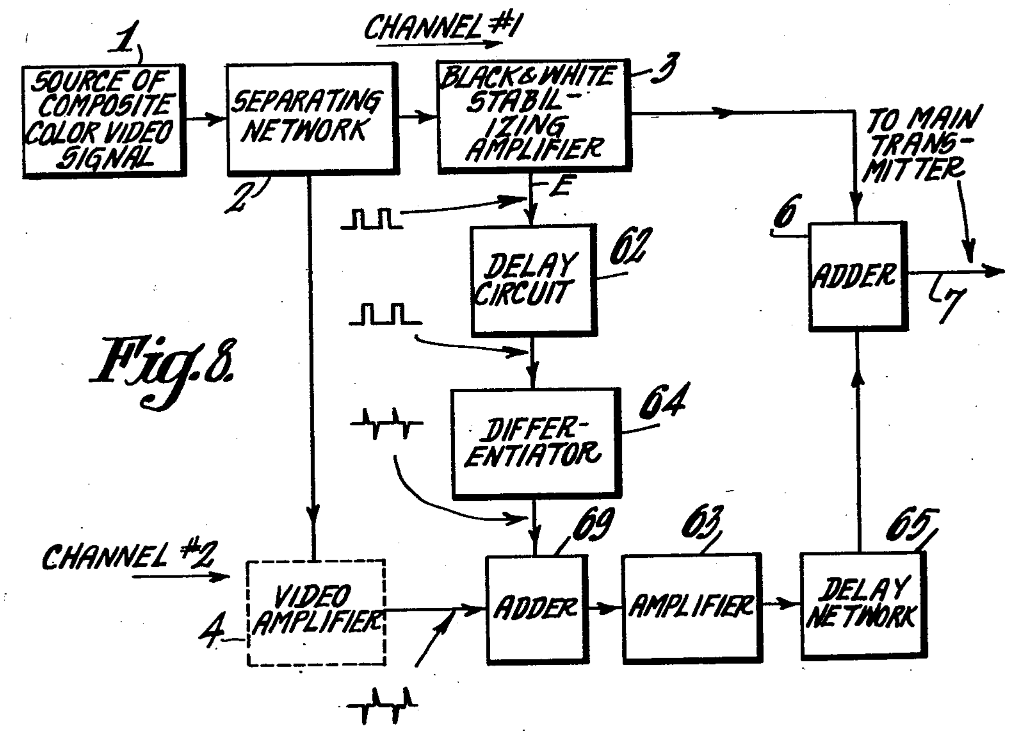
Figure 8 shows still another alternative embodiment of the invention in block form.

While the delay circuit 62 of Figure 7 is in channel two it may be elsewhere in the circuit as shown in Figure 8 which operates the same except for the delay. When placed between point E and the differentiator 64, it may take the form of a multivibrator circuit having a relatively long delay. In this case, the delay will be about 63.5 microseconds, the duration of one line, and the differentiator 64 pulses will cancel the pips on the next line. Delay lines or lumped constant delay circuits conceivably could be used, but for such a long delay they are unwieldy and impractical.

Still another way of introducing delay is the insertion of a delay circuit 62 between the differentiator 64 and adder 69. This delay would also approximate 63.5 microseconds and could be obtained by a multivibrator circuit, but since the output of the latter would be a square wave, a differentiating network would then be required to obtain sharp pulses necessary to cancel out the pips. For the time delay required, lumped constant circuits or delay lines would be impractical.

Having thus described the invention, what is claimed is:

1. In a system for transmission of composite color video signals of the type including a horizontal synchronizing pulse and a burst of a subcarrier frequency on each horizontal blanking pulse, color components and monochrome information, the combination including means adapted to be coupled to a source of said composite signals for separating said color components and said burst from said monochrome information and said synchronizing pulses contained in said composite signals, said separating means including frequency responsive means, said frequency responsive means being resonant to said burst frequency, means coupled to said separating means for removing interference from said monochrome information and said synchronizing pulses, said interference removing means also amplifying said monochrome information and said synchronizing pulses, means coupled to said separating means for amplifying said color components and said burst, means responsive to said synchronizing pulses and coupled to said color and burst amplifying means for cancelling pips caused by high frequency components of said horizontal blanking pulse passing through said separating means to said color and burst amplifying means, and combining means for said interference removing means with said color and burst amplifying means.

2. In a system for transmission of composite color video signals of the type including a horizontal synchronizing pulse and a burst of a subcarrier frequency on each horizontal blanking pulse, color components and monochrome information and including a stabilizing amplifier, the combination including means adapted to be coupled to a source of said signals for separating said color components and said burst from said monochrome information and said synchronizing pulses contained in said composite signals, said separating means including means responsive to the frequency of said color components and said burst, means coupled to said separating means for amplifying said color components and said burst, said stabilizing amplifier being coupled to said separating means, means responsive to said synchronizing pulses coupled to said means for amplifying said color components and said burst, said synchronizing pulse responsive means adapted to remove pips caused to appear in said color components and burst due to high frequency components of said horizontal synchronizing pulse passed by said separating means, and combining means for coupling said stabilizing amplifier to said means for amplifying said color components and burst.

3. In a system for transmission of composite color video signals of the type including a horizontal synchronizing pulse and a burst of a subcarrier frequency signal on each horizontal blanking pulse, color components and monohcrome information, the combination including means adapted to be coupled with a source of said composite color video signals for separating said color components and said burst from said monochrome information and said synchronizing pulses contained in said composite signals, said separating means having a first branch and a second branch, said first branch including in series a first resistance and a series resonant circuit resonant to said burst frequency, said second branch including a series circuit including a second resistance, an inductance, and a tank circuit, said tank circuit being resonant to said burst frequency, a first amplifying means coupled to said first branch, black-and-white stabilizing amplifier means coupled to said first amplifying means, said stabilizing amplifier means having an output circuit, a second amplifying means coupled to said second branch, a first delay means coupled to said second amplifying means, a third amplifying means coupled to said first delay means, said third amplifying means having an output circuit, a pip-cancelling means for cancelling pips in said second branch due to high frequency components of said horizontal synchronizing pulses passed by said separating means, said pip-cancelling means including a differentiating circuit adapted to be responsive to said synchronizing pulses, a second delay means coupled to said differentiating circuit, a phase-splitting means coupled to said second relay means, a clamping means coupled to said phase-splitting means, said clamping means also being coupled to said output circuit of said third amplifying means, and a means for combining the output of said stabilizing amplifier means with the output of said third amplifying means.

4. In a system for transmission of composite color video signals of the type including a horizontal synchronizing pulse and a burst of a subcarrier frequency signal on each horizontal blanking pulse, color components and monochrome information the combination including: means adapted to be coupled to a source of said composite signals for separating said color components and said burst from said monochrome information and said synchronizing pulses contained in said composite signals, said separating network having a first branch and a second branch, said first branch and said second branch being connected in parallel, said first branch including in series a first resistance and a first impedance circuit, said first impedance circuit comprising a series resonant circuit, said second branch including in series a second resistance, and a second impedance circuit, said second impedance circuit comprising in series an inductance and a tank circuit, said first resistance being equal to said second resistance, said series resonant circuit and said tank circuit being resonant to said burst frequency, the resistance product of said first resistance and said second resistance being equal to the impedance product of said first impedance circuit, and said second impedance product, black-and-white stabilizing amplifier means coupled to said first branch, first amplifying means coupled to said second branch, first delay means coupled to said stabilizing amplifier means, pip-cancelling means coupled to said first delay means, said pip-cancelling means including a differentiating circuit responsive to said horizontal synchronizing pulses, first combining means for coupling said differentiating circuit with said first amplifying means, second amplifying means coupled to said first combining means, second delay means coupled to said second amplifying means, and second combining means for coupling said second delay means to said stabilizing amplifier means.

5. In a system for transmission of composite color video signals of the type including a horizontal synchronizing pulse and a burst of a subcarrier frequency on each horizontal blanking pulse, color components and monochrome information, and having a stabilizing amplifier the combination including, means adapted to be coupled with a source of said composite color video signals for separating said color components and said burst from said monochrome information and said synchronizing pulses contained in said composite signals, said separating means having a first branch and a second branch, said first branch including in series a first resistance and a series resonant circuit resonant to said burst signal, said second branch including a series of circuit comprising a second resistance, an inductance, and a tank circuit, said tank circuit being resonant to said burst frequency, a first amplifying means coupled to said first branch, said stabilizing amplifier coupled to said first amplifying means, a second amplifying means coupled to said second branch, a first delay means coupled to said second amplifying means, a third amplifying means coupled to said first delay means, a pipe-cancelling means coupled to said stabilizing amplifier, said pip-cancelling means including a differentiating circuit responsive to said synchronizing pulses, a second delay means coupled to said differentiating circuit, a phase-splitting means coupled to said second delay means, a clamping means coupled to said phase-splitting means, said clamping means also being coupled to said third amplifying means, and a means for coupling said stabilizing amplifier with said third amplifying means.

6. In a system for transmission of composite color video signals of the type including a horizontal synchronizing pulse and a burst of a subcarrier frequency on each horizontal blanking pulse, color components and monochrome information, the combination including: a separating network adapted to be coupled to a source of said composite color video signals, said separating network having a first branch and a second branch, said first branch including in series a first resistance and a series resonant circuit resonant to said burst frequency, said second branch including in series a second resistance, an inductance and a tank circuit, said tank circuit being resonant to said burst frequency, a polarity inverter connected across said series resonant circuit, a first amplifying stage coupled to said polarity inverter, a cathode follower connected in series with said first amplifying stage, a black-and-white stabilizing amplifier coupled to said cathode follower, a second isolating amplifying stage connected to second branch, a delay transmission line coupled to said second amplifying stage, a cascaded amplifying network connected to said transmission line, said cascaded network comprising a plurality of amplifying stages, a differentiating network coupled to said stabilizing amplifier, said differentiating network being responsive to said horizontal sync pulses, a first phase-reversing circuit coupled to said differentiating network, a unidirectional current device in shunt with said first phase-reversing circuit adapted to minimize a specific component of the output of said first phase-reversing circuit, a first delay multivibrator in series with said first phase-reversing circuit, a second unidirectional current device coupled to said first delay multivibrator to minimize a specific component of the output of said first multivibrator, a second delay multivibrator connected in series with said first delay multivibrator, a third unidirectional current device coupled to said second multivibrator to minimize a specific component in the output of said second multivibrator, a third delay multivibrator connected in series with said second multivibrator, said first, second, and third multivibrators having a delay time of the order of the duration of one horizontal line, a phase-splitting network in series with said third multivibrator, a clamping circuit coupled to said phase-splitting network, said clamping circuit including a plurality of unidirectional current devices connected to said phase-splitting network, said plurality of unidirectional current devices being coupled to said cascaded amplifying network, said plurality of unidirectional current devices being adapted to substantially eliminate pips in said color components and said burst caused by said second branch, a second phase-reversing circuit coupled to said cascaded amplifying network, and an adding stage for coupling said black-and-white stabilizing amplifier with said second phase reversing circuit.

7. In a system for transmission of composite color video signals of the type including a horizontal synchronizing pulse and a burst of a subcarrier frequency signal on each horizontal blanking pulse, color components and monochrome information, the combination including: a source of said composite color video signals, a separating network coupled to said composite signal source, said separating network having a first branch and a second branch said first branch including a first resistance and a series resonant circuit resonant to the burst frequency, said first resistance and said series resonant circuit being serially connected, said second branch including in series a second resistance, an inductance, and a tank circuit said tank circuit being resonant to said burst frequency, a first amplifying means coupled to said first branch, black-and-white stabilizing amplifier means coupled to said first amplifying means, a second amplifying means coupled to said second branch, a first delay means coupled to said second amplifying means, pip-cancelling means coupled to an output of said stabilizing amplifier means for cancelling pips in said second branch due to high frequency components of said horizontal synchronizing pulses passed by said separating network, said pip-cancelling means including a differentiating circuit responsive to said horizontal synchronizing pulses, a first combining means for coupling said differentiating circuit with said first delay means, a third amplifying means coupled to said first combining means, a second delay means coupled to said third amplifying means, and a second combining means for coupling said second delay means to said stabilizing amplifier means.

8. In a system for transmission of composite color video signals of the type including a horizontal synchronizing pulse and a burst of a subcarrier frequency on each horizontal blanking pulse, color components and monochrome information, the combination including: a separating network adapted to be coupled to a source of said composite color video signals, said separating network having a first branch and a second branch, said first branch and said second branch being in parallel, said first branch including in series a first resistance and a first impedance circuit, said first impedance circuit comprising a series resonant circuit resonant to said burst frequency, said second branch including in series a second resistance and a second impedance circuit, said second impedance circuit comprising an inductance and a tank circuit, said first resistance being equal to said second resistance, said tank circuit being resonant to said burst frequency, the resistance product of said first resistance and said second resistance being equal to the impedance product of said first impedance circuit and said second impedance circuit, a black-and-white stabilizing amplifier in parallel to said first impedance circuit, a first video amplifier parallel to said second impedance circuit, a delay line of a relatively short delay time coupled to said first video amplifier, a differentiating circuit coupled to said stabilizing amplifier, said differentiating circuit being responsive to said synchronizing pulses, first combining means for coupling said delay line to said differentiating circuit, a second video amplifier coupled to said combining means, a second delay circuit coupled to said second video amplifier and a second combining means for coupling said stabilizing amplifier to said second delay circuit.

9. In a system for transmission of composite color video signals of the type including a horizontal synchronizing pulse and a burst of a subcarrier frequency on each horizontal blanking pulse, color components and monochrome information, the combination including: a separating network adapted to be coupled to a source of said composite color video signals, said separating network having a first branch and a second branch, said first branch and said second branch being in parallel, said first branch including in series a first resistance and a first impedance circuit, said first impedance circuit comprising a series resonant circuit resonant to said burst frequency, said second branch including in series a second resistance and a second impedance circuit, said second impedance circuit comprising an inductance and a tank circuit, said tank circuit being resonant to said burst frequency, said first resistance being equal to said second resistance, the resistance product of said first resistance and said second resistance being equal to the impedance products of said first impedance circuit and said second impedance circuit, a black-and-white stabilizing amplifier coupled to said first impedance circuit, a first video amplifier in parallel with said second impedance circuit, first delay means adapted to be energized by said synchronizing pulses, said first delay means effecting a delay of the order of the duration of one horizontal line, said first delay means comprising a plurality of multivibrators, a network coupled to said multivibrator output for deriving differentiated pulses therefrom, first combining means for coupling said differentiating network to said first video amplifier, a second video amplifier coupled to said first combining means, a second delay circuit coupled to said second amplifying means, and a second combining means for coupling said stabilizing amplifier to said second delay circuit.

10. A stabilizing amplifier for composite color video signals wherein monochrome frequency components occupy a given frequency range, bursts and chrominance frequency components occupy the high frequency portion of said range, and horizontal synchronizing pulse frequency components exist in both the high and low frequency portions of said range, comprising in combination, a frequency separating network having an input adapted to be coupled to a source of said composite color video signals and having a low frequency output and a high frequency output, signal combining means having two inputs, a low frequency channel coupled from the low frequency output of said separating network to one input of said signal combining means, a high frequency channel coupled from the high frequency output of said separating network to the other input of said signal combining means, said high frequency channel being receptive to the chroma and burst signals and also to the high frequency components of the horizontal synchronizing pulse which have the undesired effect of producing pips at times corresponding with the leading and trailing edges of the horizontal synchronizing pulses, means receptive to said horizontal synchronizing pulses and operative to generate a pip-cancelling signal, and means to apply said pip-cancelling signal to said high frequency channel.

11. A stabilizing amplifier for composite color video signals wherein monochrome frequency components occupy a given frequency range, bursts and chrominance frequency components occupy the high frequency portion of said range, and horizontal synchronizing pulse frequency components exist in both the high and low frequency portions of said range, comprising in combination, a frequency separating network having an input adapted to be coupled to a source of said composite color video signals and having a low frequency output and a high frequency output, signal combining means having two inputs, a low frequency channel coupled from the low frequency output of said separating network to one input of said signal combining means, said low frequency channel including distortion correcting means for said horizontal synchronizing pulse, a high frequency channel coupled from the high frequency output of said separating network to the other input of said signal combining means, said high frequency channel being receptive to the chroma and burst signals and also to the high frequency components of the horizontal synchronizing pulse which have the undesired effect of producing pips at times corresponding with the leading and trailing edges of the horizontal synchronizing pulses, means coupled to the distortion correcting means in said low frequency channel to generate a pip-cancelling signal, and means to apply said pip-cancelling signal to said high frequency channel.

References Cited in the file of this patent

UNITED STATES PATENTS

| | | |
|---|---|---|
| 2,096,031 | Cork et al. | Oct. 19, 1937 |
| 2,227,415 | Wolff | Dec. 31, 1940 |
| 2,351,191 | Crosby | June 13, 1944 |
| 2,450,818 | Vermillion | Oct. 5, 1948 |